(12) United States Patent
Salter et al.

(10) Patent No.: US 11,549,477 B1
(45) Date of Patent: Jan. 10, 2023

(54) SPLIT CHARGE BATTERY START ASSIST

(71) Applicant: Ford Global Technologies, LLC, Dearborn, MI (US)

(72) Inventors: Stuart C. Salter, White Lake, MI (US); Alasdair Collins, Billericay (GB); David Celinske, Wolverine Lake, MI (US); Anthony Thomas Spoto, Birmingham, MI (US); Todd Ansbacher, Westland, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/816,162

(22) Filed: Jul. 29, 2022

(51) Int. Cl.
*F02N 11/08* (2006.01)
*H01M 50/204* (2021.01)
*H01M 10/48* (2006.01)
*H01M 50/249* (2021.01)

(52) U.S. Cl.
CPC ........ *F02N 11/087* (2013.01); *F02N 11/0866* (2013.01); *H01M 10/482* (2013.01); *H01M 50/204* (2021.01); *H01M 50/249* (2021.01); *F02N 2011/0874* (2013.01); *F02N 2200/041* (2013.01); *F02N 2200/061* (2013.01); *H01M 2220/20* (2013.01)

(58) Field of Classification Search
CPC ............... F02N 11/087; F02N 11/0866; F02N 2011/0874; F02N 2200/041; F02N 2200/061; H01M 50/204; H01M 50/249; H01M 2220/20; H01M 10/482

USPC .................... 701/112, 113; 123/179.3, 179.4
See application file for complete search history.

(56) References Cited

U.S. PATENT DOCUMENTS

| | | | |
|---|---|---|---|
| 5,767,658 | A | 6/1998 | Hayes |
| 6,545,445 | B1 | 4/2003 | McDermott et al. |
| 7,151,326 | B2 | 12/2006 | Jordan |
| 9,452,720 | B2 | 9/2016 | Brey |
| 10,168,364 | B2 | 1/2019 | Chakrabarty |
| 10,879,710 | B2 | 12/2020 | Park |
| 2006/0058897 | A1 | 3/2006 | Senda et al. |
| 2012/0306266 | A1 | 12/2012 | Ohnuki |
| 2017/0106819 | A1 | 4/2017 | Richardson et al. |
| 2020/0114764 | A1 | 4/2020 | Johnson |

FOREIGN PATENT DOCUMENTS

| | | | |
|---|---|---|---|
| DE | 102016207033 A1 | | 10/2017 |
| JP | 201667142 A | | 4/2016 |
| JP | 6730167 B2 | | 7/2020 |

*Primary Examiner* — Hai H Huynh
(74) *Attorney, Agent, or Firm* — Frank Lollo; Bejin Bieneman PLC

(57) ABSTRACT

An electrical system of a vehicle includes a first battery, a second battery, a first switch electrically connected in series between the first battery and the second battery, an external connection point, and a second switch electrically connected in series between the second battery and the external connection point. The system and a method of operating the system include determining that the first battery will need assistance to start an engine of the vehicle, opening the second switch in response to a state of charge of the second battery decreasing below a charge threshold, and closing the first switch for the second battery to assist the first battery to crank the engine for starting.

20 Claims, 5 Drawing Sheets

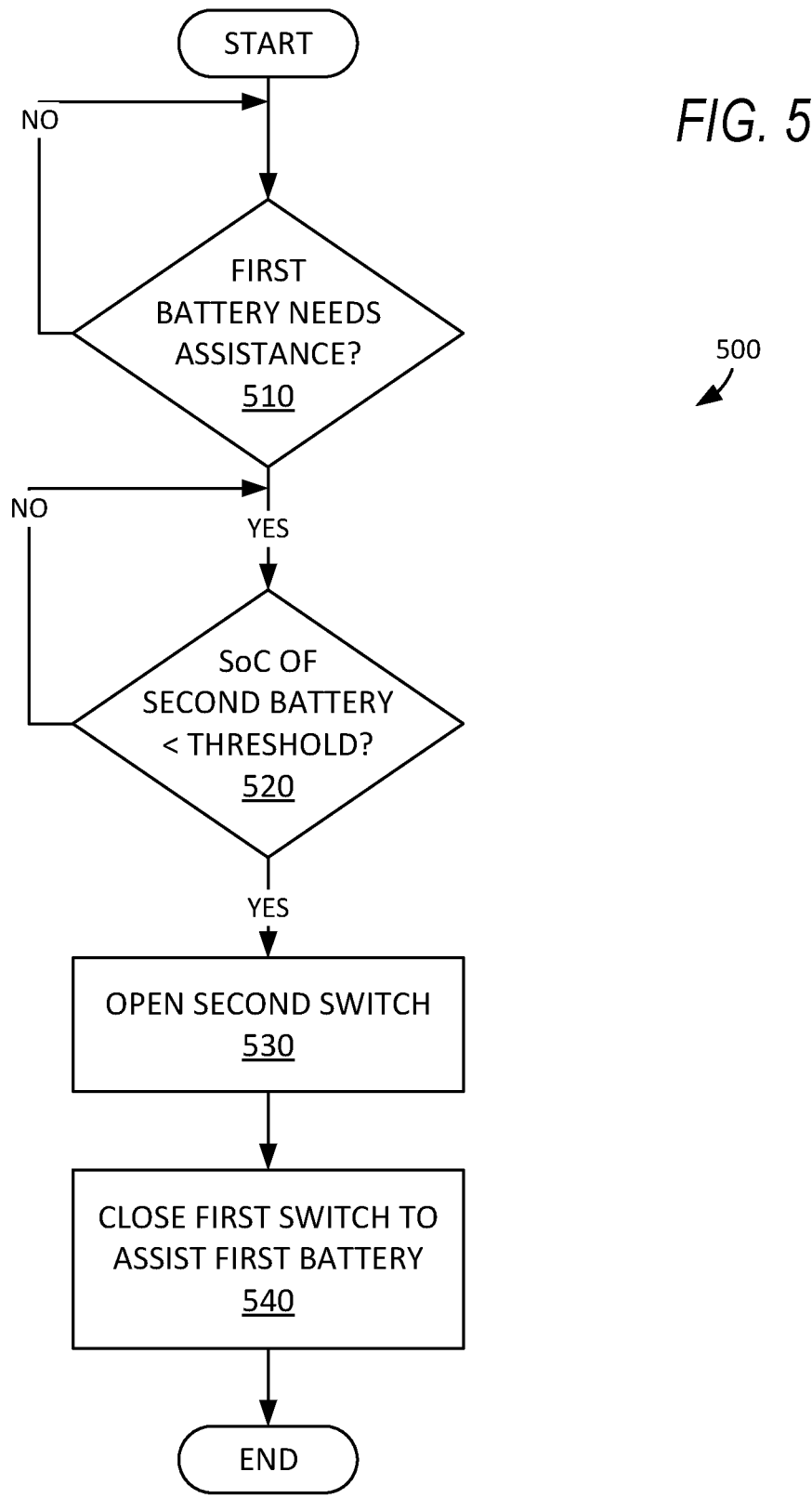

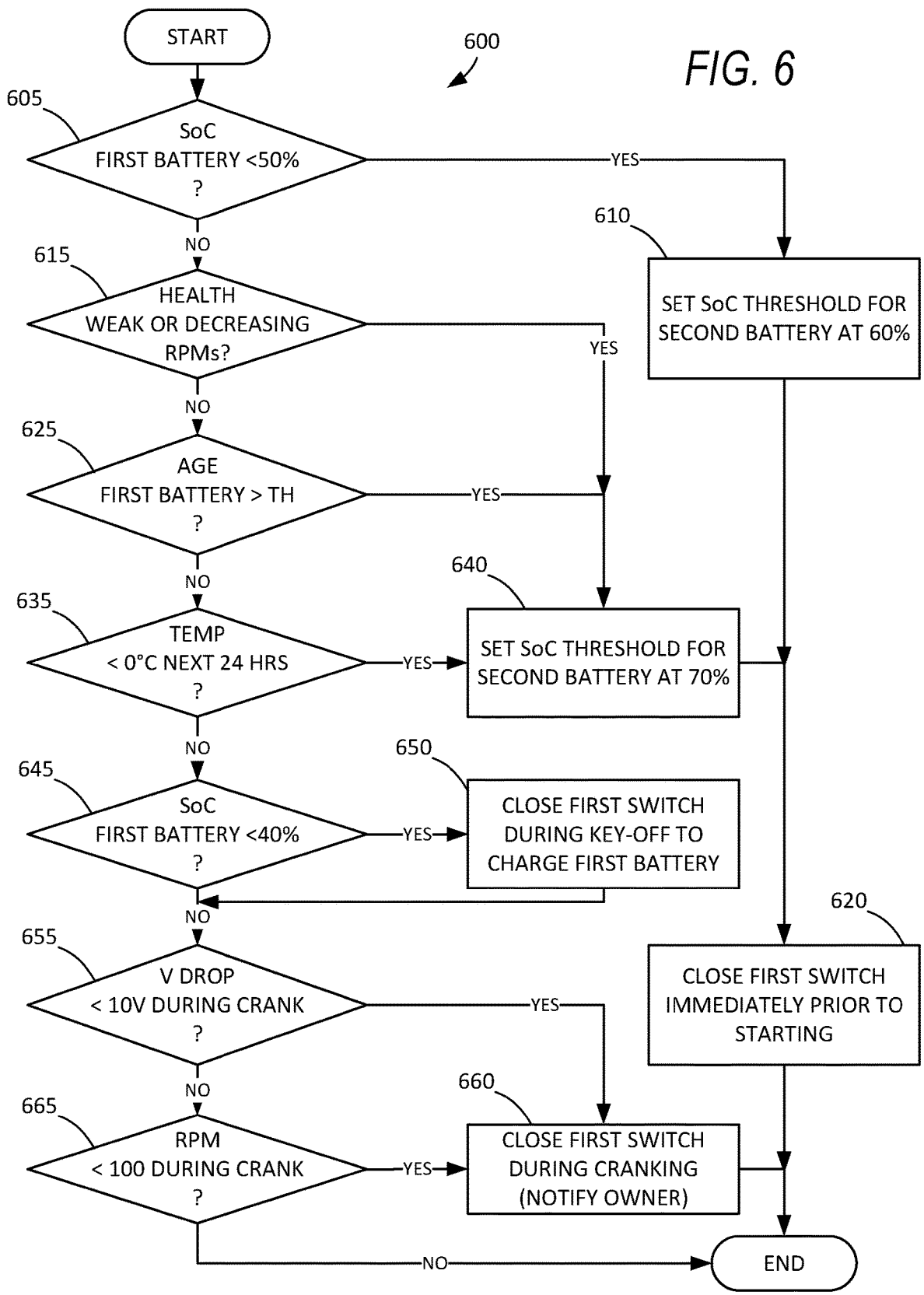

SPLIT CHARGE BATTERY START ASSIST

BACKGROUND

Motor vehicles typically include at least one primary battery. Types of batteries include lithium-ion batteries, nickel-metal hydride batteries, and lead-acid batteries. The primary battery is used to start the motor of the vehicle. When the operator turns the ignition, current from the primary battery is provided to a solenoid switch causing the solenoid switch to close and electrically connect the primary battery to a starter. The starter converts the electrical energy from the primary battery into rotational kinetic energy to start the motor.

BRIEF DESCRIPTION OF THE DRAWINGS

FIG. 5 is a process flow diagram of an example process for controlling a vehicle electrical system.

FIG. 6 is a process flow diagram of an example process for controlling a vehicle electrical system.

DETAILED DESCRIPTION

Figure 1:
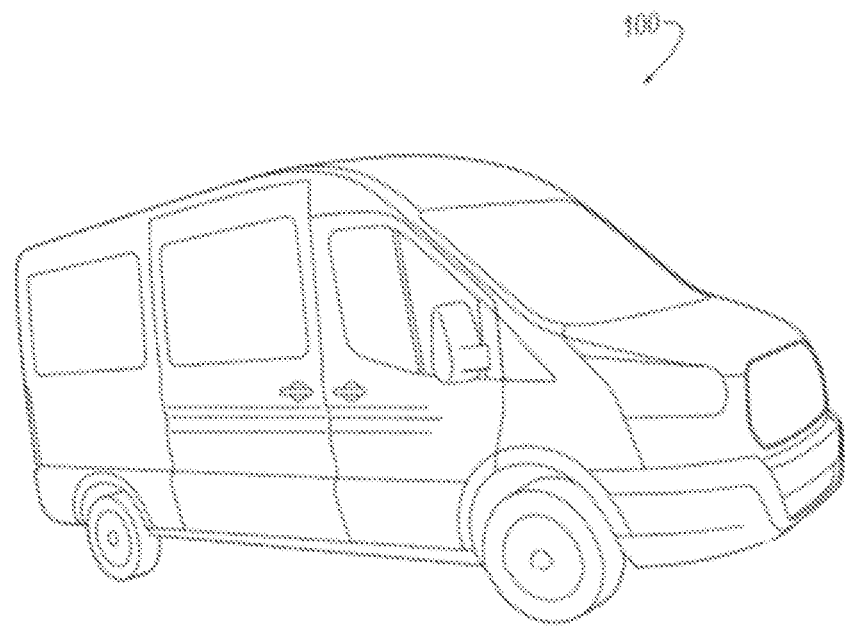
FIG. 1 is a perspective view of an example vehicle.

In addition to a primary battery, a vehicle may be equipped with one or more auxiliary batteries that may be used to provide power to non-vehicle loads, such as to charge or power electronic devices such as cell phones, tablets, laptops, speaker systems, lights, air compressors, power tools, etc. When the primary battery cannot start a vehicle on its own, one or more auxiliary batteries may be used to assist the primary battery to start the vehicle if the one or more auxiliary batteries have a sufficient state of charge.

In accordance with the present disclosure, a state of charge (SoC) of one or more auxiliary batteries (e.g., a "second battery") can be maintained at a sufficient level to assist a primary battery (e.g., a "first battery") when it is determined that the primary battery may be likely to need assistance, such as when the health of the primary battery is weak, when the primary battery is old, when the ambient temperature is low, when a SoC of the primary battery is low, or when the cranking speed produced by the primary battery is slowing over multiple consecutive starts. With a sufficient SoC, the one or more auxiliary batteries can be connected to the primary battery to assist in starting the vehicle when the primary battery needs assistance. Additionally, since the primary battery is typically best situated to start the vehicle, when a SoC of the primary battery is low, the one or more auxiliary batteries may be used to charge the primary battery during a key-off period.

In one or more implementations of the present disclosure, an electrical system of a vehicle includes a first battery, a second battery, a first switch electrically connected in series between the first battery and the second battery, an external connection point, a second switch electrically connected in series between the second battery and the external connection point, and a computer communicatively coupled to the first switch and the second switch. The computer may be programmed with computer executable instructions to determine that the first battery will need assistance to start an engine of the vehicle, instruct the second switch to open in response to a state of charge of the second battery decreasing below a charge threshold, and instruct the first switch to close for the second battery to assist the first battery crank the engine for starting.

In an example implementation, the instructions executable to determine that the first battery will need assistance may determine that a state of charge of the first battery is less than 50%, the instructions executable to instruct the second switch to open may be in response to the state of charge of the second battery decreasing below 60%, and the instructions executable to instruct the first switch to close may be performed before beginning to crank the engine.

In another example implementation, the instructions executable to determine that the first battery will need assistance may determine that a health of the first battery is weak, the instructions executable to instruct the second switch to open may be in response to the state of charge of the second battery decreasing below 70%, and the instructions executable to instruct the first switch to close may be performed before beginning to crank the engine.

In a further example implementation, the instructions executable to determine that the first battery will need assistance may determine that an age of the first battery has exceeded a threshold age, the instructions executable to instruct the second switch to open may be in response to the state of charge of the second battery decreasing below 70%, and the instructions executable to instruct the first switch to close may be performed before beginning to crank the engine.

In another example implementation, the instructions executable to determine that the first battery will need assistance may determine that an outside ambient temperature is or is predicted to be below 0° C. in a location of the vehicle within a next 24 hours, the instructions executable to instruct the second switch to open may be in response to the state of charge of the second battery decreasing below 70%, and the instructions executable to instruct the first switch to close may be performed before beginning to crank the engine.

In an example implementation, the instructions executable to determine that the first battery will need assistance may determine that a cranking speed during a first crank of a day is decreasing over a period of a last three starts, the instructions executable to instruct the second switch to open may be in response to the state of charge of the second battery decreasing below 70%, and the instructions executable to instruct the first switch to close may be performed before beginning to crank the engine.

In a further example implementation, the instructions executable to determine that the first battery will need assistance may determine that a state of charge of the first battery is below 40%, and the instructions executable to instruct the first switch to close may be performed during a key-off period and keep the first switch closed until the second battery has raised the state of charge of the first battery above 50%.

In yet another example implementation, the instructions executable to determine that the first battery will need assistance may further include instructions to determine that a voltage (V) of the first battery during cranking drops below 10 V, and the instructions executable to instruct the first switch to close may be performed during cranking.

In another example implementation, the instructions executable to determine that the first battery will need assistance may further include instructions to determine that a cranking speed in rotations per minute (RPM) during a cranking performed by the first battery is below 100 RPM, and the instructions executable to instruct the first switch to close may be performed during cranking. In this example, instructions may further send a notification that the first battery is performing poorly.

One or more implementations of the present disclosure may include a method of operating an electrical system of a vehicle having a first battery, a second battery, a first switch electrically connected in series between the first battery and the second battery, an external connection point, and a second switch electrically connected in series between the second battery and the external connection point. The method may include determining that the first battery will need assistance to start an engine of the vehicle, opening the second switch in response to a state of charge of the second battery decreasing below a charge threshold, and closing the first switch for the second battery to assist the first battery crank the engine for starting.

In an example method, determining that the first battery will need assistance may include determining that a state of charge of the first battery is less than 50%, opening of the second switch may be in response to the state of charge of the second battery decreasing below 60%, and closing of the first switch may be performed before beginning to crank the engine.

In another example of the method, determining that the first battery will need assistance may include determining that a health of the first battery is weak, opening of the second switch may be in response to the state of charge of the second battery decreasing below 70%, and closing of the first switch may be performed before beginning to crank the engine.

In a further example of the method, determining that the first battery will need assistance may include determining that an age of the first battery has exceeded a threshold age, opening of the second switch may be in response to the state of charge of the second battery decreasing below 70%, and closing of the first switch may be performed before beginning to crank the engine.

In yet another example of the method, determining that the first battery will need assistance may include determining that an outside ambient temperature is or is predicted to be below 0° C. in a location of the vehicle within a next 24 hours, opening of the second switch may be in response to the state of charge of the second battery decreasing below 70%, and closing of the first switch may be performed before beginning to crank the engine.

In a further example of the method, determining that the first battery will need assistance may include determining that a cranking speed during a first crank of a day is decreasing over a period of a last three starts, opening of the second switch may be in response to the state of charge of the second battery decreasing below 70%, and closing of the first switch may be performed before beginning to crank the engine.

In an example of the method, determining that the first battery will need assistance may include determining that a state of charge of the first battery is below 40%, and closing of the first switch may be performed during a key-off period and keep the first switch closed until the second battery has raised the state of charge of the first battery above 50%.

In another example of the method, determining that the first battery will need assistance may include determining that a voltage (V) of the first battery during cranking drops below 10 V, and closing of the first switch may be performed during cranking.

In a further example of the method, determining that the first battery will need assistance may include determining that a cranking speed in rotations per minute (RPM) during a cranking performed by the first battery is below 100 RPM, and closing of the first switch may be performed during cranking. This method may further include sending a notification that the first battery is performing poorly.

With reference to the Figures, wherein like numerals indicate like parts throughout the several views, a vehicle electrical system 102 for a vehicle 100 includes a first battery 114, a first switch 116, a second battery 104, at least one external connection point 106, a second switch 108 electrically connected in series between the second battery 104 and the at least one external connection point 106, and a computer 110 communicatively coupled to the first switch 116 and second switch 108. The computer 110 is programmed to instruct the second switch 108 to open in response to a state of charge of the second battery 104 decreasing below a charge threshold.

The external connection points 106 permit an operator to connect nonvehicle loads to the vehicle electrical system 102. The second battery 104 provides power to the nonvehicle loads even when an ignition 112 of the vehicle 100 is off. (As described below, the vehicle 100 can include a first battery 114 separated from the second battery 104 by a first switch 116, and the first battery 114 can be used to start the vehicle 100.) Using the second switch 108 to disconnect the external connection point 106 from the second battery 104 at the charge threshold can maintain sufficient charge the second battery 104 to assist the first battery 114 when the first battery 114 may need assistance to start the vehicle 100.

With reference to FIG. 1, the vehicle 100 may be any suitable type of ground vehicle 100, e.g., a passenger or commercial automobile such as a sedan, a coupe, a truck, a sport utility, a crossover, a van, a minivan, a taxi, a bus, etc.

Figure 2:
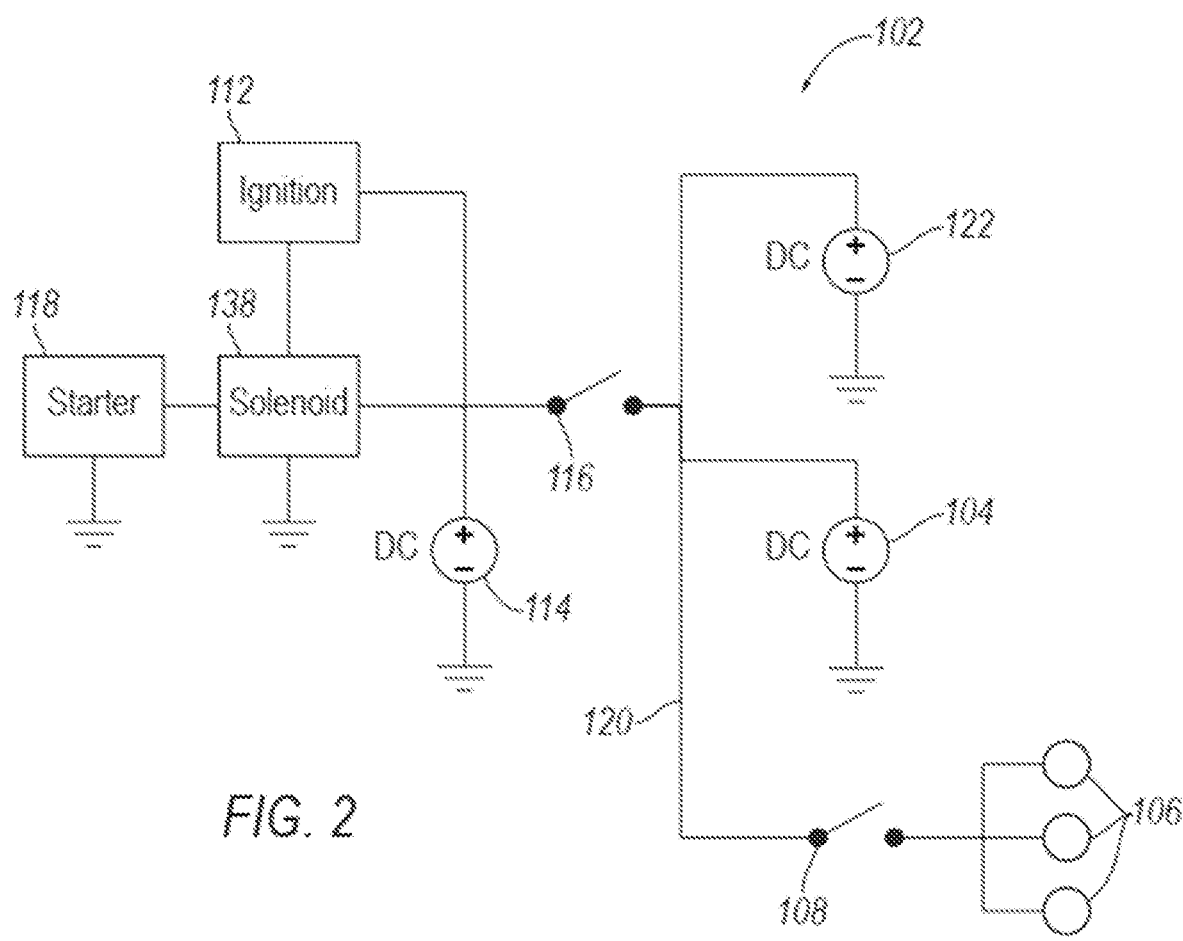
FIG. 2 is a circuit diagram of an example vehicle electrical system.

With reference to FIG. 2, the first battery 114 may be of any suitable type for vehicular electrification, for example, lithium-ion batteries, nickel-metal hydride batteries, lead-acid batteries, or ultracapacitors, as used in, for example, internal-combustion-engine (ICE) vehicles 100, plug-in hybrid electric vehicles 100 (PHEVs), hybrid electric vehicles 100 (HEVs), or battery electric vehicles 100 (BEVs).

The vehicle 100 includes the ignition 112. The ignition 112 can be movable by the operator between, e.g., an off state, an on state, an accessories state, and a starting state. For example, the ignition 112 can be a barrel rotatable between positions corresponding to the states, the ignition 112 can be a push button that is in the starting state when pressed. The ignition 112 can be biased to move out of the starting position, e.g., by having a spring that rotationally biases the barrel from the starting position to the on position or biases the button from the pressed position to the unpressed position. The ignition 112 is electrically connected to the first battery 114. The first battery 114 is configured to supply power to a starter 118 in response to a signal from the ignition 112. For example, when the ignition 112 is in the starting state, the ignition 112 supplies power from the first battery 114 to a solenoid, causing the solenoid to close and thereby complete a circuit for current to flow from the first battery 114 to the starter 118.

The starter 118 can start an engine or motor (not shown) of the vehicle 100. The starter 118 can be, e.g., an electric motor that rotates when a voltage is applied, e.g., by being electrically connected to the first battery 114.

The first switch 116 is electrically connected in series between the first battery 114 and the second battery 104. The first switch 116 is electrically connected in series between the first battery 114 and the second switch 108. For example, the first switch 116 is electrically connected in series between the first battery 114 and a node 120 directly connected to the second battery 104 and the second switch 108. When the first switch 116 is closed, current is permitted to flow between the first battery 114 and the second battery 104 and second switch 108. When the first switch 116 is open, the first battery 114 is electrically isolated from the second battery 104 and second switch 108.

The first switch 116 is switchable between closed and open. For example, the first switch 116 can be a relay, i.e., an electrically operated switch. The first switch 116 can switch from open to closed or vice versa in response to a signal, e.g., from the ignition 112 or the computer 110.

The first switch 116 can be configured to be open in response to the ignition 112 being in the off state. For example, the ignition 112 can send a signal to the first switch 116 to open when turning off. The external connection points 106 thus do not draw down the first battery 114 when the vehicle 100 is not running. The first switch 116 can be configured to be closed in response to the ignition 112 being in the on state. For example, the ignition 112 can send a signal to the first switch 116 to close when the ignition 112 is released after starting the vehicle 100. The motor can thus charge the second battery 104 along with the first battery 114 when the vehicle 100 is running.

The second battery 104 may be of any suitable type for vehicular electrification, for example, lithium-ion batteries, nickel-metal hydride batteries, lead-acid batteries, or ultracapacitors, as used in, for example, internal-combustion-engine (ICE) vehicles 100, plug-in hybrid electric vehicles 100 (PHEVs), hybrid electric vehicles 100 (HEVs), or battery electric vehicles 100 (BEVs). The second battery 104 can have a lower capacity than the first battery 114.

The vehicle 100 may include a third battery 122. The third battery 122 may be of any suitable type for vehicular electrification, for example, lithium-ion batteries, nickel-metal hydride batteries, lead-acid batteries, or ultracapacitors, as used in, for example, internal-combustion-engine (ICE) vehicles 100, plug-in hybrid electric vehicles 100 (PHEVs), hybrid electric vehicles 100 (HEVs), or battery electric vehicles 100 (BEVs). The third battery 122 can be connected in parallel to the second battery 104. The third battery 122 can be connected to the node 120 that is directly connected to the second battery 104, the second switch 108, and the first switch 116.

The second switch 108 is electrically connected in series between the second battery 104 and third battery 122 and the external connection points 106. When the second switch 108 is closed, current is permitted to flow between the second battery 104 and third battery 122 and the external connection points 106. When the first switch 116 is open, the external connection points 106 are electrically isolated from the second battery 104 and third battery 122.

The second switch 108 is switchable between closed and open. For example, the second switch 108 can be a relay, i.e., an electrically operated switch. The second switch 108 can switch from open to closed or vice versa in response to a signal, e.g., from the ignition 112 or the computer 110.

The vehicle electrical system 102 includes at least one external connection point 106, e.g., a plurality of external connection points 106. The external connection points 106 are features to which the operator can electrically connect nonvehicle loads, i.e., electrical loads that are not part of the vehicle 100. When the second switch 108 is open, the second battery 104 and third battery 122 supply electricity to the nonvehicle loads via the external connection points 106.

Figure 3:
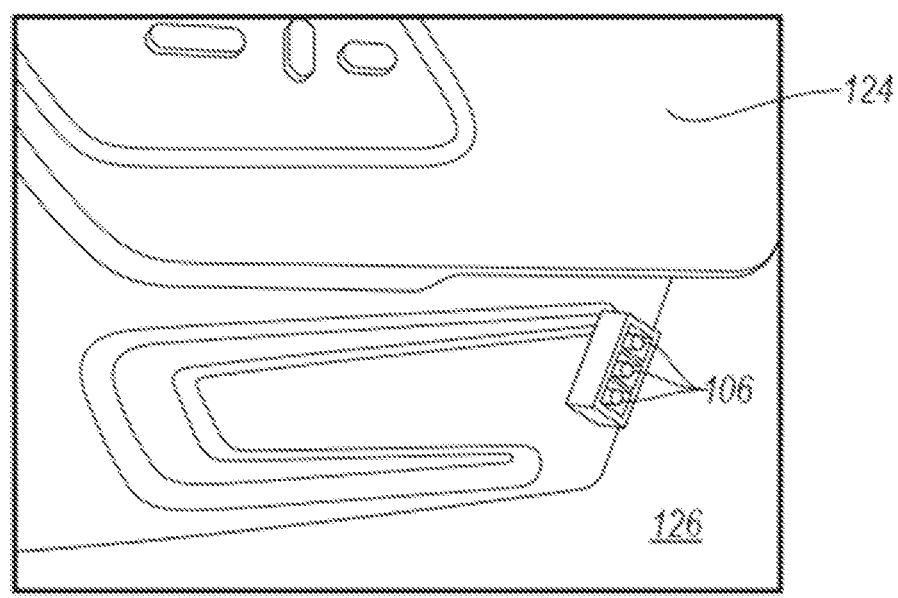
FIG. 3 is a perspective view of external connection points of the vehicle electrical system.

With reference to FIG. 3, the external connection points 106 can be located in a position on the vehicle 100 in which the external connection points 106 are accessible to the operator and able to be covered when not in use. For example, the external connection points 106 can be located at a bottom of a driver seat 124 in a passenger cabin 126 of the vehicle 100. Thus, a nonvehicle load located outside the vehicle 100 can be easily electrically connected to one of the external connection points 106.

The external connection points 106 can be any type of feature to which a nonvehicle load can be securely and temporarily attached. For example, as shown in FIG. 3, the external connection points 106 are studs, to which the nonvehicle loads can be electrically connected by clipping or screwing.

Figure 4:
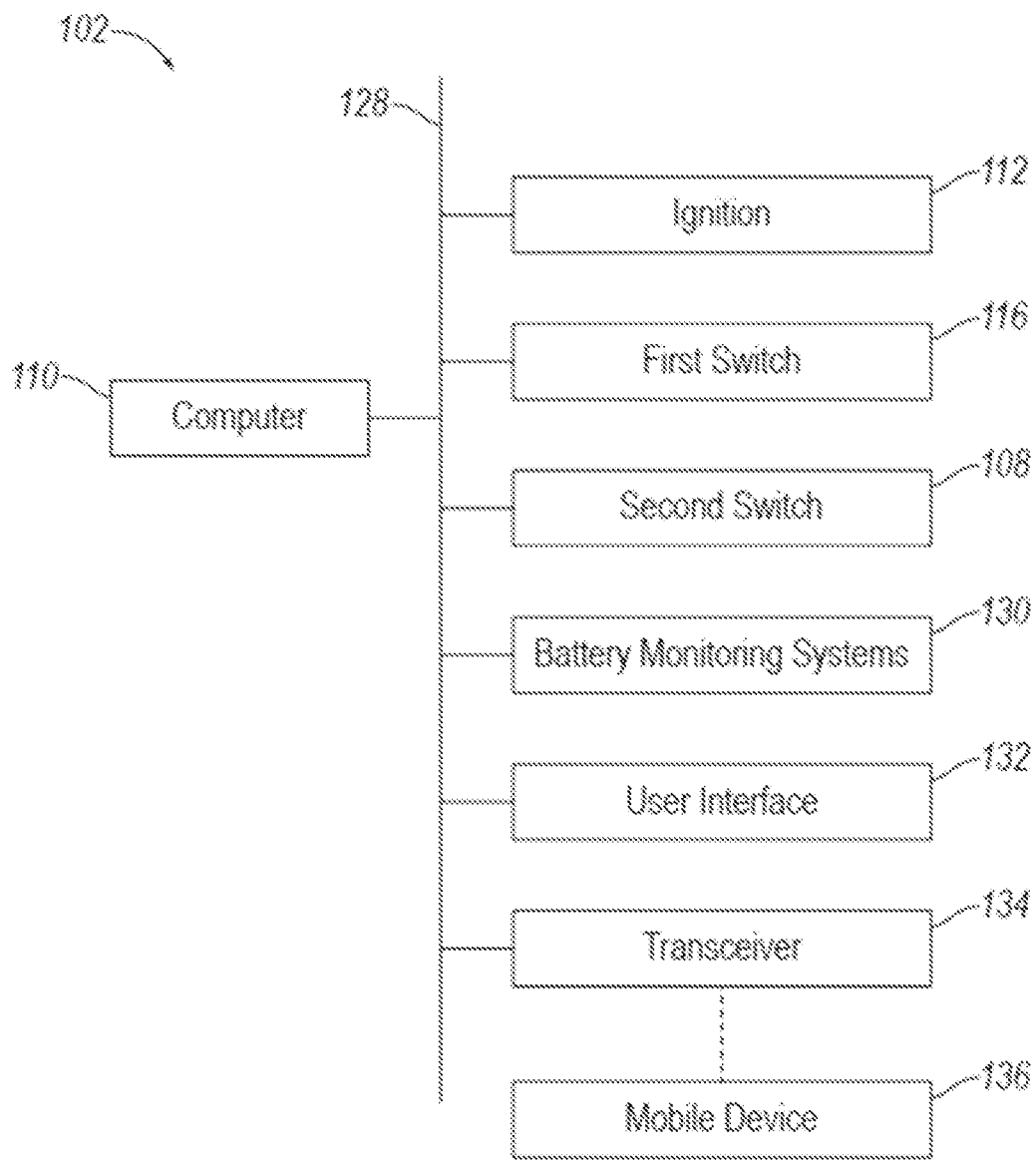
FIG. 4 is a block diagram of a control system of the vehicle electrical system.

With reference to FIG. 4, the computer 110 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 110 can thus include a processor, a memory, etc. The memory of the computer 110 can include media for storing instructions executable by the processor as well as for electronically storing data and/or databases, and/or the computer 110 can include structures such as the foregoing by which programming is provided. The computer 110 can be multiple computers 110 coupled together.

The computer 110 may transmit and receive data through a communications network 128 such as a controller area network (CAN) bus, Ethernet, Wi-Fi, Local Interconnect Network (LIN), onboard diagnostics connector (OBD-II), and/or by any other wired or wireless communications network 128. The computer 110 may be communicatively coupled to the first switch 116, the second switch 108, a battery monitoring system 130, a user interface 132, a transceiver 134, and other components via the communications network 128.

The vehicle electrical system 102 can include the battery monitoring systems 130 for the first battery 114, the second battery 104, and the third battery 122. As is known, the battery monitoring systems 130 can detect voltage, current, temperature, etc. The battery monitoring systems 130 can calculate state of charge, state of health, number of cycles, etc. The state of charge is the quantity of charge remaining in a battery. The state of health is an actual condition of a battery compared to its ideal condition, e.g., capacity, voltage, internal resistance, etc. The battery monitoring systems 130 may also store data relating to when a battery has been installed in order to calculate an age of the battery.

The user interface 132 presents information to and receives information from the operator of the vehicle 100. The user interface 132 may be located, e.g., on an instrument panel in the passenger cabin 126 of the vehicle 100, or wherever may be readily seen by the operator. The user interface 132 may include dials, digital readouts, screens, speakers, and so on for providing information to the operator, e.g., human-machine interface (HMI) elements such as are known. The user interface 132 may include buttons, knobs, keypads, microphone, and so on for receiving information from the operator.

The transceiver 134 may be adapted to transmit signals wirelessly through any suitable wireless communication protocol, such as cellular, Bluetooth®, Bluetooth® Low Energy (BLE), ultra-wideband (UWB), Wi-Fi, IEEE 802.11a/b/g/p, cellular-V2X (CV2X), Dedicated Short-Range Communications (DSRC), other RF (radio frequency) communications, etc. The transceiver 134 may be adapted to communicate with a remote server, that is, a server distinct and spaced from the vehicle 100. The remote server may be located outside the vehicle 100. For example, the remote server may be associated with another vehicle 100 (e.g., V2V communications), an infrastructure component (e.g., V2I communications), an emergency responder, a mobile device 136 associated with the operator of the vehicle 100, etc. The transceiver 134 may be one device or may include a separate transmitter and receiver.

The mobile device 136 is a portable computing device such as a mobile phone, e.g., a smartphone, or a tablet. The mobile device 136 is a computing device including a processor and a memory. The mobile device 136 is associated with the vehicle 100, e.g., is owned and carried by a person who may be the operator or owner of the vehicle 100.

The computer 110 of the vehicle electrical system 102 can open the second switch 108 in response to a state of charge of the second battery 104 and/or third battery 122 decreasing below the charge threshold, thus isolating the external connection points 106 from the second battery 104 and third battery 122. The charge threshold can be chosen to prevent the second battery 104 and/or third battery 122 from experiencing a deep discharge that may diminish a capacity of the second battery 104 and/or third battery 122. In addition to opening the second switch 108, the computer 110 of the vehicle electrical system 102 can also start the ignition 112 of the vehicle 100 in response to the state of charge of the second battery 104 and/or third battery 122 decreasing below the charge threshold, permitting the second battery 104 and third battery 122 to be recharged.

The charge threshold can vary based on the states of health of the first battery 114, second battery 104, and third battery 122. The state of health is an actual condition of a battery compared to its ideal condition. For example, the state of health can be an actual charge capacity relative to an ideal or nominal charge capacity, e.g., of a newly manufactured battery, expressed as a percentage. For another example, the state of health can be a voltage of the battery, e.g., when fully charged, relative to an ideal or nominal voltage, e.g., of a newly manufactured battery that is fully charged, expressed as a percentage. For another example, the state of health can be a metric based on one or more measured values of the battery, e.g., internal resistance, capacity, voltage, self-discharge, ability to accept a charge, number of charge-discharge cycles, age of the battery, battery temperature, total energy charged and discharged, etc., as is known. The states of health of the batteries 114, 104, and 122 can be determined by the battery monitoring systems 130 and/or can be determined by the computer 110 based on data from the battery monitoring systems 130.

The computer 110 can determine the charge threshold based on the state of health. The charge threshold can increase as the state of health of the second battery 104 and/or the third battery 122 decreases. For example, the computer 110 can determine the charge threshold to provide a buffer against a deep discharge, which may occur as the state of health decreases.

The computer 110 can also determine a state of charge (SoC) of the first battery 114, the second battery 104, and the third battery 122. Thus, when an SoC of the first battery 114 is low (e.g., <50% or 40%), the second switch 108 may be opened by computer 110 to maintain the SoC of the second battery 104 and/or the third battery 122 at a higher level (e.g., 60% or 70%) so that the second battery 104 and/or the third battery 122 may be able to assist the first battery 114 in starting the vehicle 100.

The computer 110 can provide a notification to the operator, as discussed below, when the first battery 114 is performing poorly.

The computer 110 can also provide a notification to the operator in response to the state of health of one of the batteries being below a health threshold. The operator can then replace the battery with the low state of health. The state of health is an actual condition of a battery compared to its ideal condition. For example, the state of health can be an actual charge capacity relative to an ideal or nominal charge capacity, e.g., of a newly manufactured battery, expressed as a percentage. For another example, the state of health can be a voltage of the battery, e.g., when fully charged, relative to an ideal or nominal voltage, e.g., of a newly manufactured battery that is fully charged, expressed as a percentage. For another example, the state of health can be a metric based on one or more measured values of the battery, e.g., internal resistance, capacity, voltage, self-discharge, ability to accept a charge, number of charge-discharge cycles, age of the battery, battery temperature, total energy charged and discharged, etc. The states of health of the batteries can be determined by the battery monitoring system 130 and/or can be determined by the computer 110 based on data from the battery monitoring system 130.

The health threshold is a predetermined value stored in the memory of the computer 110 and expressed in the same units as the state of health. The health threshold can be different for the first battery 114 than for the second battery 104 and third battery 122. The health threshold can be chosen to be above a point at which the battery is no longer suitable for its intended task, e.g., when the first battery 114 cannot reliably start the vehicle 100 or when the second battery 104 or third battery 122 cannot power a typical nonvehicle load for a period of time expected by a typical operator.

The vehicle electrical system 102 can also provide a notification to the operator in response to the rate of discharge of the second battery 104 and/or third battery 122 being above a rate threshold. The operator can then check the status of the nonvehicle loads drawing power from the second battery 104 and third battery 122 and, e.g., disconnect one or more of the nonvehicle loads or adjust one or more of the nonvehicle loads to draw less power. The rate of discharge can be determined as described above. The rate threshold is a predetermined value stored in the memory of the computer 110 and expressed in the same units as the rate of discharge. The rate threshold can be chosen to indicate that the rate of discharge is close to tripping a fuse, is generating high temperatures in the vehicle electrical system 102, etc.

FIG. 5 is a process flow diagram illustrating an example process 500 for controlling the vehicle electrical system 102. The memory of the computer 110 stores executable instructions for performing the steps of the process 500 and/or programming can be implemented in structures such as mentioned above. The computer 110 receives data from the battery monitoring system 130 and other sources (i.e., temperature data, cranking RPM's over time, etc.) and determines the state of health and state of charge for the first battery 114, the second battery 104, and/or the third battery 122. In general, the determination steps of process 500 may be performed, at least partially, during a key-off period unless otherwise stated.

The process 500 begins in a block 510, in which the computer 110 receives data (e.g., battery health, battery age, battery SoC, ambient temperature conditions, etc.) and determines if it is likely that the first battery 114 will need assistance to start the vehicle 100. If it is determined that the first battery 114 will not need assistance at block 510 ("NO"), then the computer 110 can wait until additional data has been collected, and continue making determinations based on additional data. If it is determined at block 510 that the first battery 114 will need assistance ("YES"), the computer 110 receives the states of charge (SoC) of the second battery 104 and/or the third battery 122 from the battery monitoring system 130. While the second battery 104 and/or the third battery 122 may be used to assist the first battery 114, for brevity, only second battery 104 will be discussed relative to FIGS. 5 and 6; it is to be understood that the third battery 122 could alternatively or additionally be employed if warranted.

In a block 520, the computer 110 determines whether the SoC of second battery 104 has dropped below a minimum threshold. As discussed below with respect to FIG. 6, the minimum threshold SoC for the second battery 104 may be set by computer 110 based upon the age/health/SoC of the first battery 114 or the current/expected ambient temperature conditions. If the SoC of the second battery 104 has not dropped below the threshold at block 520 ("NO"), the computer 110 can continue monitoring the SoC. If the SoC of the second battery 104 has dropped below the threshold at block 520 ("YES"), the method moves to block 530.

In block 530, the computer 110 sends a control signal to open the second switch 108. This isolates the second battery 104 from loads at external connection points 106 to maintain an SoC in the second battery 104 sufficient to assist first battery 114.

Next, in a block 540, the computer 110 sends a control signal to close first switch 116 so that second battery 104 may assist first battery 114 start vehicle 100. As discussed below with respect to FIG. 6, this may occur during a key-off so that second battery 104 acts to charge first battery 114, this may occur immediately before an ignition signal, or this may occur after an ignition signal and during cranking of the engine.

FIG. 6 is a more detailed process flow diagram illustrating an exemplary process 600 for controlling the vehicle electrical system 102. While specific SoC percentages, voltage levels, cranking RPMs, and time periods are disclosed below, it is understand that variations in vehicle electrical systems and measurement precision may permit changes in these values without departing from the scope of the present disclosure, and the recited values may include variations of up to +/−5% or +/−10%.

In a first block 605, computer 110 determines whether an SoC of the first battery 114 has dropped below 50%. If the SoC of the first battery 114 has dropped below 50% ("YES"), computer 110 sets the SoC threshold value for the second battery 104 at 60% in a block 610 so that sufficient charge is maintained in the second battery 104 to assist the first battery 114. In a block 620, computer 110 sends a control signal to close first switch 116 immediately prior to an ignition signal so that both the first battery 114 and the second battery 104 are used to crank the engine.

If the SoC of the first battery 114 has not dropped below 50% at block 605 ("NO"), computer 110 determines whether the health of the first battery 114 is weak based on the battery monitoring system 130 outputting, in a block 615, data specifying that the battery 114 health is weak. If the health of the first battery 114 is weak ("YES"), computer 110 sets the SoC threshold value for the second battery 104 at 70% in a block 640 so that sufficient charge is maintained in the second battery 104 to assist the first battery 114. Alternatively, computer 110 determines, in the block 615, whether the RPMs measured during the last three initial starts of the day by the first battery 114 has been decreasing based on data from the battery monitoring system 130 in the block 615. If the data indicates that the RPMs for the past three first starts of the day have been decreasing ("YES"), computer 110 sets the SoC threshold value for the second battery 104 at 70% in the block 640 so that sufficient charge is maintained in the second battery 104 to assist the first battery 114.

Following the block 640, in the block 620, as discussed above, computer 110 sends a control signal to close first switch 116 immediately prior to an ignition signal so that both the first battery 114 and the second battery 104 are used to crank the engine.

If the health of the first battery 114 is not weak at block 615 ("NO"), computer 110 determines whether the age of the first battery 114 is over a set threshold (TH) in a block 625. If the age of the first battery 114 is over the threshold TH ("YES"), computer 110 sets the SoC threshold value for the second battery 104 at 70% in a block 640 so that sufficient charge is maintained in the second battery 104 to assist the first battery 114. Next, in block 620, computer 110 sends a control signal to close first switch 116 immediately prior to an ignition signal so that both the first battery 114 and the second battery 104 are used to crank the engine.

If the age of the first battery 114 is not over the threshold at block 625 ("NO"), computer 110 determines whether the current and/or expected temperature for the next 24 hours is/will be below freezing (<0° C.) in a block 635. If the 24-hour temperature will be below freezing ("YES"), computer 110 sets the SoC threshold value for the second battery 104 at 70% in the block 640 so that sufficient charge is maintained in the second battery 104 to assist the first battery 114. The block 620 then follows the block 640 as explained above.

If the 24-hour temperature will not be below freezing at block 635 ("NO"), computer 110 determines whether an SoC of the first battery 114 has dropped below 40% in a block 645. If the SoC of the first battery 114 has dropped below 40% ("YES"), computer 110 sends a control signal to close first switch 116 during a key-off period so that the first battery 114 may be charged by the second battery 104 (assuming it has a higher SoC) in a block 650.

If the SoC of the first battery 114 is not below 40% at block 645 ("NO"), computer 110 and battery monitoring system 130 determine whether a voltage has dropped below 10 V during cranking of the engine in a block 655. If the voltage has dropped below 10 V ("YES"), then, in a block 660, computer 110 sends a control signal to close first switch 116 during cranking so that both the first battery 114 and the second battery 104 are used to crank the engine.

If the voltage from the first battery 114 has not dropped below 10 V during cranking at block 655 ("NO"), computer 110 determines whether a cranking speed has dropped below 100 RPM during cranking of the engine in a block 665. If the RPM has dropped below 100 ("YES"), then, in the block 660, computer 110 sends a control signal to close first switch 116 during cranking so that both the first battery 114 and the second battery 104 are used to crank the engine. As a cranking voltage below 10V or a cranking RPM below 100 indicate a poorly operating battery, computer 110 may send a notification, such as to the owner via user interface 132 or to a remote server, that the battery (i.e., the first battery 114) is performing poorly and/or should be replaced.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. Use of "in response to" and "upon determining" indicates a causal relationship, not merely a temporal relationship. The adjectives "first," "second," and "third" are used throughout this document as identifiers and are not intended to signify importance, order, or quantity.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. An electrical system of a vehicle comprising:
a first battery;
a second battery;
a first switch electrically connected in series between the first battery and the second battery;
an external connection point;
a second switch electrically connected in series between the second battery and the external connection point; and
a computer communicatively coupled to the first switch and the second switch, the computer programmed with computer executable instructions to:

determine that the first battery will need assistance to start an engine of the vehicle;
instruct the second switch to open in response to a state of charge of the second battery decreasing below a charge threshold; and
instruct the first switch to close for the second battery to assist the first battery to crank the engine for starting.

2. The electrical system of claim 1, wherein:
the instructions executable to determine that the first battery will need assistance determines that a state of charge of the first battery is less than 50%;
the instructions executable to instruct the second switch to open is in response to the state of charge of the second battery decreasing below 60%; and
the instructions executable to instruct the first switch to close is performed before beginning to crank the engine.

3. The electrical system of claim 1, wherein:
the instructions executable to determine that the first battery will need assistance determines that a health of the first battery is weak;
the instructions executable to instruct the second switch to open is in response to the state of charge of the second battery decreasing below 70%; and
the instructions executable to instruct the first switch to close is performed before beginning to crank the engine.

4. The electrical system of claim 1, wherein:
the instructions executable to determine that the first battery will need assistance determines that an age of the first battery has exceeded a threshold age;
the instructions executable to instruct the second switch to open is in response to the state of charge of the second battery decreasing below 70%; and
the instructions executable to instruct the first switch to close is performed before beginning to crank the engine.

5. The electrical system of claim 1, wherein:
the instructions executable to determine that the first battery will need assistance determines that an outside ambient temperature is or is predicted to be below 0*C in a location of the vehicle within a next 24 hours;
the instructions executable to instruct the second switch to open is in response to the state of charge of the second battery decreasing below 70%; and
the instructions executable to instruct the first switch to close is performed before beginning to crank the engine.

6. The electrical system of claim 1, wherein:
the instructions executable to determine that the first battery will need assistance determines that a cranking speed during a first crank of a day is decreasing over a period of a last three starts;
the instructions executable to instruct the second switch to open is in response to the state of charge of the second battery decreasing below 70%; and
the instructions executable to instruct the first switch to close is performed before beginning to crank the engine.

7. The electrical system of claim 1, wherein:
the instructions executable to determine that the first battery will need assistance determines that a state of charge of the first battery is below 40%; and
the instructions executable to instruct the first switch to close is performed during a key-off period and keep the first switch closed until the second battery has raised the state of charge of the first battery above 50%.

8. The electrical system of claim 1, wherein:
the instructions executable to determine that the first battery will need assistance further includes instructions to determine that a voltage (V) of the first battery during cranking drops below 10 V; and
the instructions executable to instruct the first switch to close is performed during cranking.

9. The electrical system of claim 1, wherein:
the instructions executable to determine that the first battery will need assistance further includes instructions to determine that a cranking speed in rotations per minute (RPM) during a cranking performed by the first battery is below 100 RPM; and
the instructions executable to instruct the first switch to close is performed during cranking.

10. The electrical system of claim 9, further comprising instructions to:
send a notification that the first battery is performing poorly.

11. A method of operating an electrical system of a vehicle having a first battery, a second battery, a first switch electrically connected in series between the first battery and the second battery, an external connection point, and a second switch electrically connected in series between the second battery and the external connection point, the method comprising:
determining that the first battery will need assistance to start an engine of the vehicle;
opening the second switch in response to a state of charge of the second battery decreasing below a charge threshold; and
closing the first switch for the second battery to assist the first battery to crank the engine for starting.

12. The method of claim 11, wherein:
determining that the first battery will need assistance includes determining that a state of charge of the first battery is less than 50%;
opening of the second switch is in response to the state of charge of the second battery decreasing below 60%; and
closing of the first switch is performed before beginning to crank the engine.

13. The method of claim 11, wherein:
determining that the first battery will need assistance includes determining that a health of the first battery is weak;
opening of the second switch is in response to the state of charge of the second battery decreasing below 70%; and
closing of the first switch is performed before beginning to crank the engine.

14. The method of claim 11, wherein:
determining that the first battery will need assistance includes determining that an age of the first battery has exceeded a threshold age;
opening of the second switch is in response to the state of charge of the second battery decreasing below 70%; and
closing of the first switch is performed before beginning to crank the engine.

15. The method of claim 11, wherein:
determining that the first battery will need assistance includes determining that an outside ambient temperature is or is predicted to be below 0*C in a location of the vehicle within a next 24 hours;

opening of the second switch is in response to the state of charge of the second battery decreasing below 70%; and closing of the first switch is performed before beginning to crank the engine.

16. The method of claim 11, wherein:

determining that the first battery will need assistance includes determining that a cranking speed during a first crank of a day is decreasing over a period of a last three starts;

opening of the second switch is in response to the state of charge of the second battery decreasing below 70%; and closing of the first switch is performed before beginning to crank the engine.

17. The method of claim 11, wherein:

determining that the first battery will need assistance includes determining that a state of charge of the first battery is below 40%; and closing of the first switch is performed during a key-off period and keep the first switch closed until the second battery has raised the state of charge of the first battery above 50%.

18. The method of claim 11, wherein:

determining that the first battery will need assistance includes determining that a voltage (V) of the first battery during cranking drops below 10 V; and closing of the first switch is performed during cranking.

19. The method of claim 11, wherein:

determining that the first battery will need assistance includes determining that a cranking speed in rotations per minute (RPM) during a cranking performed by the first battery is below 100 RPM; and closing of the first switch is performed during cranking.

20. The method of claim 19, further comprising sending a notification that the first battery is performing poorly.

* * * * *

UNITED STATES PATENT AND TRADEMARK OFFICE
CERTIFICATE OF CORRECTION

PATENT NO. : 11,549,477 B1
APPLICATION NO. : 17/816162
DATED : January 10, 2023
INVENTOR(S) : Stuart C. Salter Page 1 of 1

It is certified that error appears in the above-identified patent and that said Letters Patent is hereby corrected as shown below:

In the Claims

Column 13, Line 41, Claim 5 - replace "0*C" with --0° C.--; and

Column 15, Line 66, Claim 15 - replace "0*C" with --0° C.--.

Signed and Sealed this
Twenty-seventh Day of February, 2024

Katherine Kelly Vidal
*Director of the United States Patent and Trademark Office*